United States Patent [19]
Nichols et al.

[11] 3,872,573
[45] Mar. 25, 1975

[54] PROCESS AND APPARATUS FOR MAKING HEAT RECOVERABLE COMPOSITE COUPLINGS

[75] Inventors: Paul E. Nichols, Sunnyvale; Charles L. Martin, Palo Alto, both of Calif.

[73] Assignee: Raychem Corporation, Menlo Park, Calif.

[22] Filed: Dec. 19, 1973

[21] Appl. No.: 426,336

[52] U.S. Cl. ................. 29/447, 29/234, 29/237, 29/525, 148/11.5 R, 285/381
[51] Int. Cl. ............................ B23p 11/02
[58] Field of Search ............ 29/447, 525, 234, 235, 29/237; 285/381 X; 148/11.5 R X

[56] References Cited
UNITED STATES PATENTS

| | | | |
|---|---|---|---|
| 438,836 | 10/1890 | Botsford | 29/234 X |
| 2,293,426 | 8/1942 | Coberly | 29/234 X |
| 2,433,271 | 12/1947 | Grant | 29/234 X |
| 2,647,847 | 8/1953 | Black et al. | 29/447 |
| 3,531,146 | 9/1970 | Blad et al. | 285/381 X |
| 3,579,805 | 5/1971 | Kast | 29/447 |
| 3,621,550 | 11/1971 | Colestack | 29/447 X |
| 3,725,994 | 4/1973 | Wechsler | 29/447 |
| 3,805,567 | 4/1974 | Agius-Sinerco | 29/447 X |

*Primary Examiner*—Charlie T. Moon
*Attorney, Agent, or Firm*—Lyon & Lyon

[57] ABSTRACT

Described herein is a process and apparatus for making a composite coupling useful in joining cylindrical substrates such as tubing. The composite coupling joins the cylindrical substrate by heat recovery of a component of a coupling over the substrate. The coupling manufacturing process comprises cooling a tubular heat-recoverable metallic compression sleeve to below a temperature at which the material undergoes a martensitic transformation, expanding the cooled metallic sleeve and inserting by means of a pilot rod a cooled tubular insert which will fit snugly and be concentrically disposed within the sleeve. The composite couplings so formed are advantaged over monolithic couplings which contain no insert by improved resistance to tensile stress, gas tight joints, and ease of manufacture.

17 Claims, 6 Drawing Figures

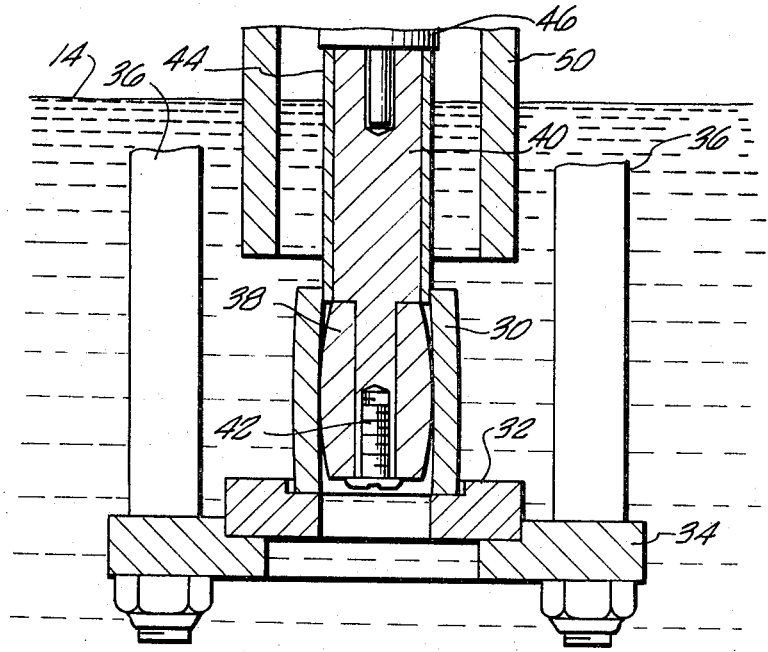
FIG.3A
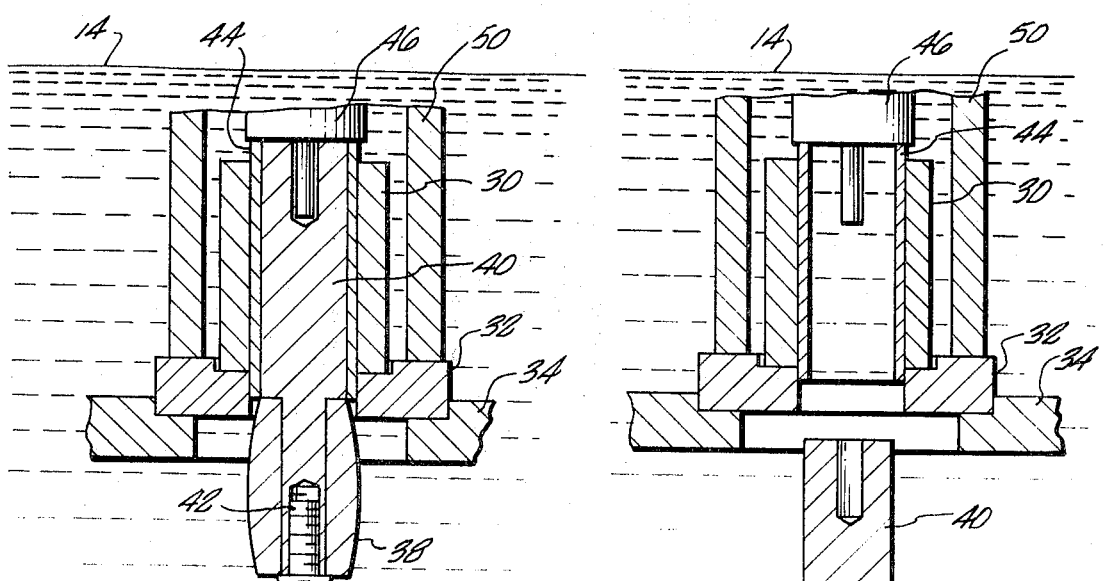
FIG.3B
FIG.3C

PROCESS AND APPARATUS FOR MAKING HEAT RECOVERABLE COMPOSITE COUPLINGS

CROSS REFERENCE TO RELATED APPLICATION

This application is related in subject to the pending applications of Charles Martin, "Composite Coupling," Serial No. 404,723, filed Oct. 9, 1973, and "Composite Coupling With Gall-Prone Insert," Ser. No. 404,724, filed Oct. 9, 1973, which diclose couplings which may be made by the present process and apparatus. Additionally, applications Ser. No. 852,722, now abandoned "Heat Recoverable Metallic Coupling," filed Aug. 25, 1969, Ser. No. 52,112, "Heat Recoverable Alloy," filed July 2, 1970, and Ser. No. 178,332, now U.S. Pat. No. 3,805,567, "Improved Methods and Means of Cryogenic Mandrel Expansion," filed Sept. 7, 1971, describe processes and materials used to make heat-recoverable metallic couplings. These disclosures, all of which are assigned to the same assignee as the present invention, are herein incorporated by reference.

BACKGROUND OF THE INVENTION

Heat recoverable materials, i.e., those which dimensionally recover from a heat unstable configuration to heat stable configuration upon the application of heat alone have previously enjoyed wide attention in diverse application. Various alloys of titanium and nickel have heretofore been disclosed as susceptible to the impartation of heat recoverability by dimensional deformation at a temperature in which the metal exists in its martensitic state. When such a metal article has been so deformed as to enlarge some dimension and then warmed to above the transition temperature at which the metal exists in the austenitic state, the article contracts to a size substantially no greater than that which it enjoyed prior to dimensional deformation. Example of such alloys may be found in U.S. Pat. Nos. 3,174,851; 3,351,463; 3,753,700; 3,759,552; the aforesaid U.S. patent application of Harrison and Jervis, and NASA Publication SP 5110, "55-Nitinol-The Alloy with a Memory, etc.," (U.S. Government Printing Office, Washington D.C. 1972). The content of these materials is expressly incorporated herein to illuminate the background of this invention. The property of heat recoverability has not, however, been solely confined to such alloys. Thus, for example, various beta-brass alloys have been domonstrated to exhibit this property in, e.g., N. Nakanski, et al., *Scripta Metallurgica* 5, 433–40 (Pergamon Press 1971) and such materials may be doped to lower their transition temperatures to cryogenic regimes by known techniques. Similarly, 304 stainless steels have been shown to enjoy such characteristics, E. Enami, et al., id. at pp. 663–68. These disclosures are similarly incorporated herein by reference.

Advantage has been taken of this property of heat recoverability to fabricate compression sleeves (i.e., tubular articles in which the forces of heat recovery are directed radially inwardly) useful in joining cylindrical substrates such as hydraulic lines and other conduit employed in aerospace applications. In the aforesaid Harrison and Jervis application and in the fabrication of other such recoverable couplings, the couplings are cooled below their transition temperature as by immersion in liquid nitrogen, and expanded outward by forcing a mandrel through them, the mandrel tapering outwardly to a transverse dimension greater than the original internal diameter of the coupling. In these so called "monolithic heat recoverable metallic couplings" heretofore employed, the interior surface of the coupling is machined prior to diametral expansion in order to provide circumferential teeth which "bite" into or otherwise deform the surface of a substrate about which the coupling is subsequently heat recovered, enhancing the ability of the resulting article to resist tensile stress and, in particular instances, to achieve a gas-tight interface between coupling and substrate. As used herein, the term "gas-tight" signifies the ability of a coupling-substrate interface as is found in a pipe joint to pass not more than one bubble per minute over a 5 minute period when an article pressurized with nitrogen at 3,000 psig is immersed in water. Various problems arise in the course of and by reason of the provision of such teeth on the interior surface of monolithic heat recoverable metallic couplings. Perhaps most significantly, such teeth are subjected to enormous contact pressures during mandrel expansion, with consequent damage to the teeth frequently sufficiently severe as to impair the ability of the coupling to form a gas-tight joint in service. Again, many metallic materials susceptible to the impartation of heat recoverability are difficult to machine. In particular applications, other problems have arisen from the monolithic nature of couplings heretofore employed. For one, such couplings tend prematurely to recover when placed over a warm substrate, requiring the use of special chilling tools to abate recovery prior to proper positioning of the coupling on the substrate. Rigid quality control procedures have been required to insure that, prior to application, lubricant deposited on the interior surface of the coupling as an aid to expansion has been removed. The somewhat limited range of materials susceptible to the impartation of heat recoverability has, in particular instances, prevented pairing of compression sleeve and substrate materials optimal from the standpoint of corrosion compatibility, thermal expansive properties, etc. It is the process and apparatus of making a composite coupling which overcomes the problems of prior art monolithic couplings to which this application is addressed.

BRIEF SUMMARY OF THE INVENTION

This invention provides a process and apparatus for making a composite coupling suitable for joining cylindrical substrates such as hydraulic tubing. The coupling comprises a cylindrical heat-recoverable metallic compression sleeve and a tubular insert sized for concentric disposition within the sleeve. The tubular insert may be formed of a gall-prone metal or an insert bearing radial teeth on at least one of its surfaces, such inserts effecting improved tensile strength and "gas-tightness" of coupled tubing when compared to the monolithic couplings of the prior art. Positioning of the insert between the heat recoverable compression sleeve and the cylindrical substrate to be coupled and about which it ultimately recovers prevents substrate contamination by a lubricant which may be present from the expansion process. In addition, employing teeth on the insert, as opposed to the use of teeth on a monolithic heat recoverable coupling sleeve itself provides several advantages. Such teeth are required for many coupling applications since they bite into the cylindrical substrate to be coupled, generally deforming it in a wave pattern. By such deformation, a gas tight seal with improved tensile strength is obtained. The advantages of having the teeth on the insert as opposed to the sleeve itself include the fact that such teeth are not subject to expansion forces, since the insert containing the teeth is positioned in the heat recoverable metallic compression sleeve after it has undergone expansion. Thus, a wider range of expansion means may be employed to accomplish expansion, such means including bead, ball or mandrel expansion. Also, machining of radial teeth on the outer surface of the insert is easier and more economical than the machining of teeth on the interior surface of the compression sleeve. It has been found, as disclosed in application "Composite Coupling," Docket No. 142/41, filed Oct. 9, 1973, that radial teeth machined on the outer surface of the insert will transmit a wave-form joint at the inner surface of the insert and the coupled tubing upon heat recovery of the compression sleeve. Of course, teeth may also be machined in the inner surface of the insert to provide a direct "bite" with the tubing to be coupled.

The process and apparatus of this invention are directed at positioning such inserts into the compression sleeve, while the sleeve is in a chilled martensitic expanded state. The process and apparatus of this invention positions the insert into the compression sleeve so it fits snugly and is properly located with respect to the ends of the compression sleeve. Such positioning of the insert is accomplished by the process of chilling the compression sleeve, expanding it, and then immediately inserting while it is in a chilled and expanded state, the coupling insert which is preferably also in a chilled state so as to prevent heating and recovery of the compression sleeve. The coupling insert is properly positioned into the compression sleeve by means of a pilot rod which is subsequently removed. The pilot rod engages the inner surface of the insert, is contiguous with the back end of the expansion means, and is connected to a force means. Thus, upon application of a force, the expansion means, which is positioned at the edge of the heat recoverable compression sleeve, is forced into the sleeve, expanding it. Movement of the expansion means through the sleeve is immediately followed by the pilot rod which is contiguous with the backside of the expansion means and which carries the insert, thereby positioning the insert immediately after expansion. Preferably, the insert is positioned so its ends extend beyond both ends of the sleeve whereby more effective strain relief for the coupled cylindrical substrate is obtained.

BRIEF DESCRIPTION OF THE DRAWINGS

FIGS. 3a–c depict the process of this invention which includes expansion of the heat recoverable sleeve and positioning of the insert.

DETAILED DESCRIPTION OF THE INVENTION

Figure 1:
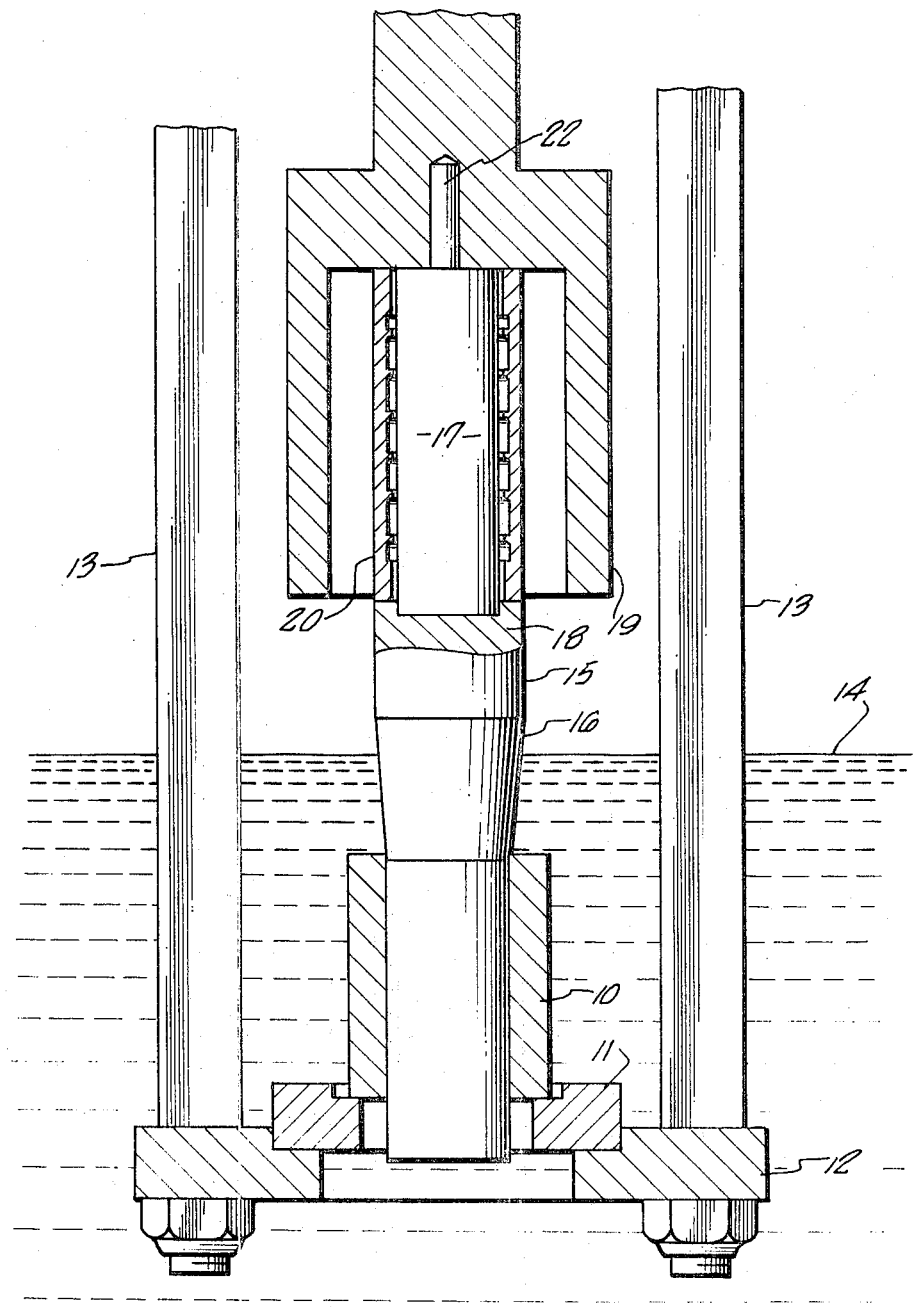
FIG. 1 is a partially sectioned view of the apparatus of this invention, which depicts the use of a mandrel as the expansion means.

Referring to FIG. 1, an expansible, heat-recoverable cylindrical sleeve 10 rests on expansion die 11 which in turn replacably supported in an annular recess in platform 12. Preferred metals for compression sleeves include equi-atomic titanium-nickel alloys, particularly the substitutional ternary alloys described in U.S. Pat. Nos. 3,759,552 and 3,753,700. Frame 13 suspends this assembly in a suitable cryogenic fluid 14, such as liquid nitrogen, so that sleeve 10 is totally immersed therein. A tapered expansion mandrel 15 is disposed in the heat-recoverable sleeve 10 so as to bring the upper portion of the sleeve into engagement with the tapered portion 16 of the mandrel. The leading end of pilot rod 17 is received in recess 18 of the after end of mandrel 15, the after end of rod 17 being detachably mounted via clearance pin, 22, on the forward end of a hydraulically powered ram terminating in housing 19. Alternatively, the ram may be powered by other suitable means, such as mechanical or pneumatic means. Concentrically disposed around the outer pilot rod 17 is coupling insert 20 having teeth machined on its inner surface which is piloted into the expanded sleeve 10 immediately after expansion by mandrel 15. The pilot rod 17 is held concentrically with mandrel 15 by recess 18. The process by which sleeve 10 is expanded, and insert 20 is positioned into the expanded sleeve, will be more fully explained in a discussion of the operation which follows.

Figure 2:
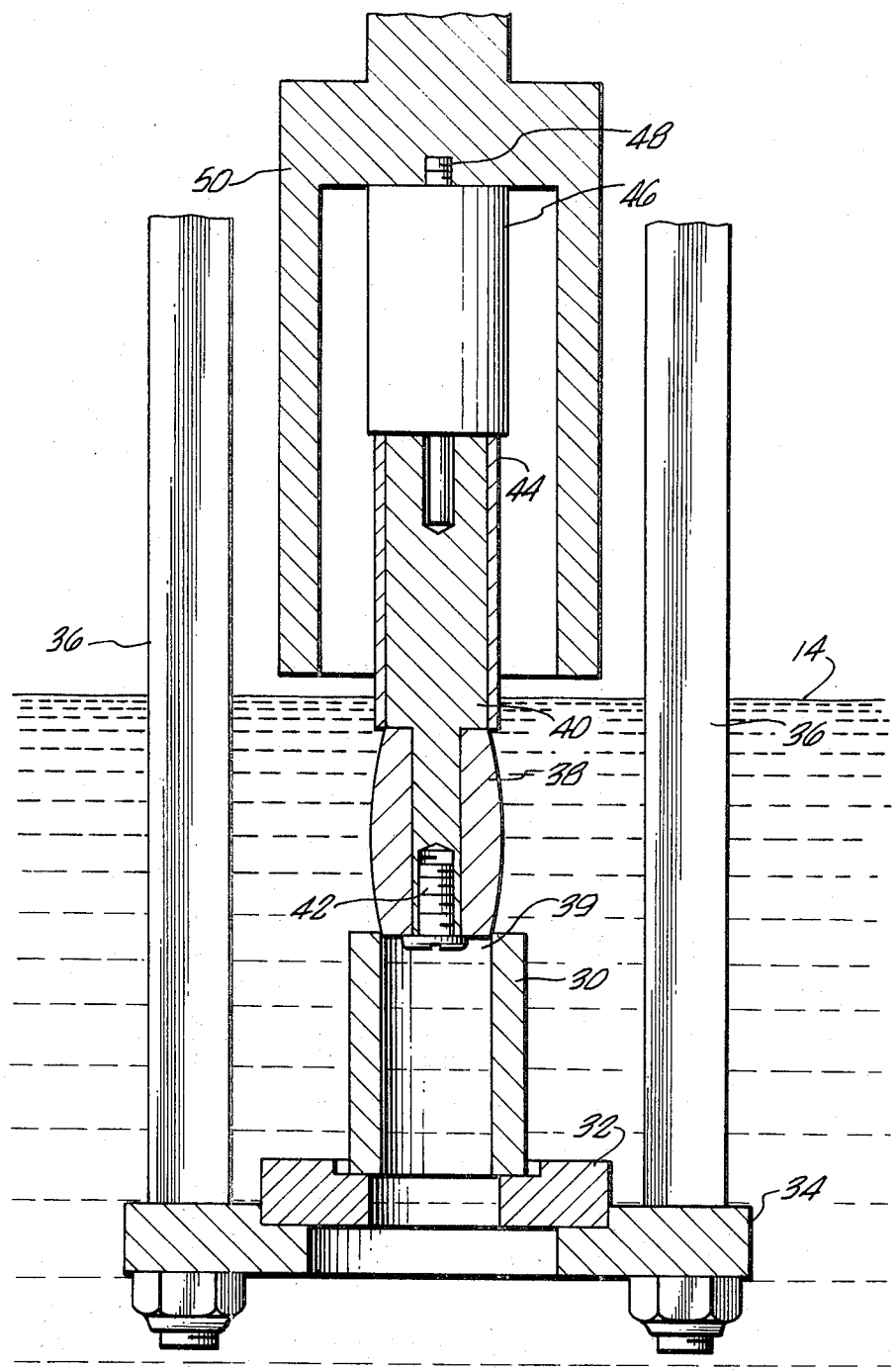
FIG. 2 shows a cross-section of an apparatus having a bead as the expansion means.

Referring to FIG. 2, a heat-recoverable sleeve 30 rests on die 32 which is supported by platform 34. Frame member 36 suspends the assembly in a suitable cryogenic fluid 14 such as liquid nitrogen. An expansion bead 38 is affixed to the pilot rod 40 by means of screw 42. The expansion bead 38, is formed such that its leading edge 39 is less than its maximum diameter. The leading edge is less than or equal to the unexpanded diameter of the heat-recoverable sleeve 30, so no force is required and little or no expansion takes place during initial insertion of the bead into the sleeve. The bead then tapers outward to a maximum diameter, such diameter being sufficient to cause sleeve 30 to expand on the order of 10 percent. After tapering to its maximum diameter, bead 38 again tapers inward to its back edge which is connected to pilot rod 40. Pilot rod 40 has positioned thereover, composite insert 44, so as to pilot the insert into the heat-recoverable sleeve 30 immediately after expansion. Insert 44 is preferably made of a gall-prone material. Pilot rod 40 is engaged at its upper end by push rod 46 which in turn is connected via screw 48 to the insertion tool housing 50.

Referring now to FIGS. 3A–C, the process of expanding the heat-recoverable member and positioning the insert concentrically therewithin will be described. It should be noted that this entire operation occurs in a cryogenic fluid so as to maintain the heat recoverable sleeve below its martensitic temperature. In addition, although the heat recoverable metal when expanded below its transition temperature will not fully recover until heated above the transition temperature, a certain amount of spring-back does occur even though the metal remains in the cyrogenic fluid. This spring-back is recovery of elastic strain resulting from release of the hoop stress imparted by the passage through the sleeve of the bead. This spring-back is distinct from thermal recovery which results when the sleeve is allowed to warm to above the martensitic temperature. Typically, the greatest dimensional expansion of the heat-recoverable sleeve is from 6 to 9 percent with retention of the expanded dimension on the order of 5–7 percent while the sleeve is immersed in the cryogenic fluid. Thus, spring-back reduces the material's 6 to 9 percent expansion to 5–7 percent, which is then the maximum amount of heat-recoverable strain present.

Because of the expansion and spring-back mechanism, an automatic means is desirable to correctly position the insert coaxially concentric within the sleeve, so as to assure a snug fit, yet prevent gouging of the insert outer surface or sleeve inner surface. It is important that the insert not only be positioned coaxially with the sleeve for which it was designed, but also, that it be directed straight into the sleeve so as to prevent unnecessary gouging. This is particularly important when the insert contains radial teeth on its exterior surface, or is made of a gall-prone material, because such teeth or material readily deforms when forced into a sleeve in a direction other than the direction of the longitudinal axis of the sleeve. The benefits of having a gall-prone metal insert or one containing radial teeth on either the interior or exterior surfaces are fully discussed in pending applications to Charles Martin, "Composite Coupling" and "Composite Coupling With Gall-Prone Insert," previously referenced and assigned to the same assignee as the present invention. Especially gall-prone material may include titanium, aluminum, magnesium and zirconium metals.

FIG. 3a depicts the insertion of the expansion bead 33 into the sleeve 30. An expansion means designed in the shape of a bead is particularly suited for this application. Upon initial insertion, the leading edge of the bead, the diameter of which is equal to or less than the unexpanded inside diameter of the sleeve 30, may be inserted into the sleeve with little or no force. The power required to force the bead through the sleeve 30 will depend upon a number of factors including the maximum expansion required, the sleeve material used as well as the degree of taper of the bead. In order to minimize the force required, a lubricant such as molybdenum disulfide may advantageously be employed on the surface of the bead or the sleeve inner surface. The bead is preferably made of a hard metal alloy, such as tool steel. After the maximum diameter of the bead passes the sleeve, it will "spring back" during passage of the back portion of the bead, since the back portion tapers inward from its maximum diameter to the back edge connected to the pilot rod. By accurately dimensioning both the inward and outward taper of the bead, the amount of expansion can be reproducibly controlled to permit the pilot rod carrying the coupling insert to snugly position the insert in the expanded sleeve. For example, in the case of an unexpanded sleeve having an internal diameter of 0.544 inch expanded with a bead having the greatest transversed dimension of 0.593 inch, the expanded compression sleeve may spring back 0.013 inch after the beads maximum diameter has passed the sleeve, thereby engaging an insert having an outer diameter of 0.580 inch in a snug, push fit.

Additionally, since the pilot rod is rigidly affixed to the expansion means via screw 42 which runs through the longitudinal axis of the bead and since the bead remains tightly positioned in the lower portion of the sleeve upon initial insertion of the pilot rod, it can be seen as in FIG. 3a that insert 44 is moved perpendicularly downward into sleeve 30.

Referring now to FIG. 3b, the insert may be positioned equidistant from the ends of the sleeve upon the seating of the insertion tool housing 50 upon the die 32. By properly positioning the composite insert 44 over the pilot rod 40 in relation to the insertion tool housing 50 which serves as a stop, proper positioning of the composite insert in the sleeve is achieved. At that point in the process in which the tool housing 50 contacts die 32, the expansion bead has passed through sleeve 30 and support plate 34.

As can then be seen from FIG. 3c, upon completion of passage of bead 38 through sleeve 30, the pilot rod 40 connected to the expansion bead immediately thereafter passes through and may be removed from the die 32, leaving the snugly fitting insert 44 properly positioned in expanded sleeve 30.

Figure 4:
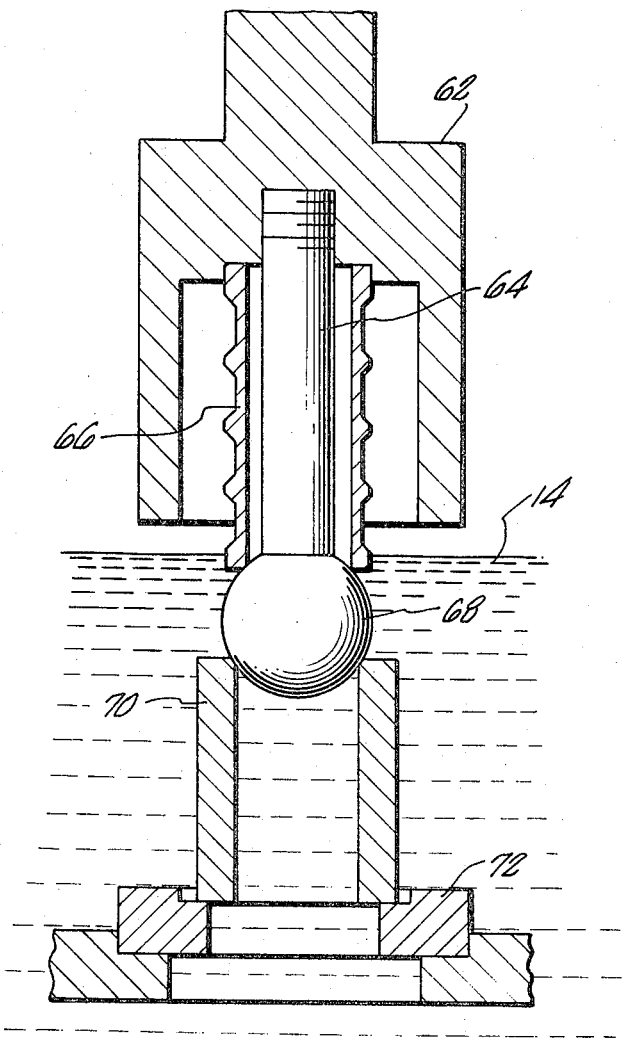
FIG. 4 shows a cross-sectioned view of the apparatus of this invention in which a ball is used as the expansion means.

Referring to FIG. 4, a ball expansion means may be used in place of the mandrel or bead previously discussed. Although generally requiring more force because the angle of taper is greater than that which is used in the mandrel or bead, such an expansion means is more readily available since ball bearings, which are manufactured to extremely close tolerances, may be used for this application. Housing assembly 62 is connected to pilot rod 64, the pilot rod carrying the insert 66 having teeth machined on its outer surface. The rod may be made of a magnetic material so as to affix expansion ball in a depression in its tip, the expansion ball generally being made of a hard chrome steel. A lubricant such as molybdenum disulfide may be coated upon the interior surface of heat recoverable sleeve 70. Upon insertion of the ball through heat-recoverable sleeve 70, the insert 66 is positioned in sleeve 70 by means of the housing assembly 62 and the die 72 which acts as a stop as previously discussed. The housing assembly, together with the pilot rod 64 may then be withdrawn, since it is held only by a magnetic force. Alternatively, the pilot rod may be permanently mounted to the ball so as to fall through the expanded sleeve with the expansion ball. If the latter procedure is to be utilized, the pilot rod is detachably mounted to the housing assembly.

After positioning the composite coupling insert into the sleeve and removing the expansion means and pilot rod, the composite coupling is ready for use for joining cylindrical substrate such as hydraulic conduits used in aircraft assemblies.

Joining is accomplished by withdrawing the composite coupling assembly from the cryogenic liquid and placing it over one end of the cylindrical substrate while it is still in the cool expanded state. A second cylindrical substrate to be joined is then abutted against the first cylindrical substrate having the composite coupler thereon, and the composite coupling is moved accross to the second cylindrical substrate so it preferably covers both substrates equally. The composite coupling is allowed to warm to room temperature and heat recover to form a gas-tight, high tensile strength joint.

What is claimed is:

1. A process for making a heat recoverable composite coupling suitable for joining cylindrical substrates comprising:
   cooling a metallic compression sleeve, said sleeve being expandable in its cooled state and recoverable upon heating;
   inserting an expansion means into the cooled sleeve to cause outward expansion;
   inserting a composite coupling insert into the cooled, expanded sleeve by means of an insert pilot rod, said pilot rod connected to a force means contiguous with said expansion means and engaging the inner surface of said insert whereby the insert is piloted into the expanded sleeve immediately after expansion;

removing the expansion means and pilot rod from the expanded heat recoverable insert coupling, whereby said coupling is ready for use to join cylindrical substrates.

2. The process of claim 1 wherein the expansion means and pilot rod are removed from the expanded, heat recoverable composite coupling by causing the expansion means and the pilot rod to pass through said composite coupling, the insert being properly and permanently positioned in said composite coupling.

3. The process of claim 1 wherein the cooled compression sleeve is expanded with a tapered tool having a leading edge equal to or less than the inside diameter of the unexpanded compression sleeve, said tool tapering outward to a maximum diameter and then tapering back inward so that the back edge of the tool is less than the maximum diameter, the back edge being connected to the pilot rod so that the sleeve is expanded to a maximum amount upon contact with the maximum diameter of the tapered tool and then is allowed to spring back so that upon insertion of the coupling insert carried on the pilot rod, the expanded sleeve springs back over the insert to form a tight composite coupling.

4. The process of claim 1 wherein the cooling step is accomplished by insertion of the sleeve into a container having liquid nitrogen.

5. An apparatus for making a heat recoverable composite coupling comprising:
   a sleeve support member for supporting a metallic compression sleeve, said sleeve being expandable in its cooled state and recoverable upon heating;
   a cooling means for cooling said metallic compression sleeve;
   an expansion means for causing the cooled metallic compression sleeve to expand;
   a means for inserting a composite coupling insert into said metallic compression sleeve, said means comprising a pilot means contiguous with the expansion means, connected to a force means, and capable of engaging the inner surface of said composite coupling insert, whereby said insert is piloted into the sleeve, immediately upon expansion.

6. The apparatus of claim 5 wherein the sleeve support member contains an opening which permits passage therethrough of the expansion means and the pilot means thereby permitting permanent insertion of the coupling insert into the sleeve with removal of the expansion and pilot means.

7. The apparatus of claim 5 wherein the expansion means is a tapered tool having a leading edge equal to or less than the inside diameter of the unexpanded compression sleeve with the tool tapering to a maximum diameter greater than the inside diameter of compression sleeve.

8. The apparatus of claim 7 wherein after the tool tapers outward to a maximum diameter, it tapers inward to the back edge connected to the pilot rod.

9. The apparatus of claim 7 wherein the tapered tool is selected from the group consisting of a ball, bead or mandrel.

10. The apparatus of claim 7 wherein the expansion means is coated with a dry film lubricant.

11. The apparatus of claim 7 wherein the metallic compression sleeve is coated with a dry film lubricant.

12. The apparatus of claim 5 wherein the cooling means is a container having liquid nitrogen.

13. The apparatus of claim 5 wherein the pilot means is rigidly fastened to the expansion means so that immediately upon expansion, the pilot means carries the composite coupling insert into the compression sleeve.

14. A process of joining cylindrical substrates comprising the steps of:
   cooling a metallic compression sleeve, said sleeve being expandable in its cooled state and recoverable upon heating;
   inserting an expansion means into the cooled sleeve to cause outward expansion;
   inserting a composite coupling insert into the cooled, expanded sleeve by means of an insert pilot rod, said pilot rod connected to a force means contiguous with said expansion means and engaging the inner surface of said insert whereby the insert is piloted into the expanded sleeve immediately after expansion;
   removing the expansion means and pilot rod from the expanded heat recoverable insert coupling;
   placing the expanded heat recoverable insert coupling over a first cylindrical substrate;
   abutting the ends of the first and a second cylindrical substrate;
   sliding the composite coupling from the first cylindrical substrate to partially cover the second cylindrical substrate and allowing the coupling to heat recover whereby said first and second cylindrical substrates are permanently joined by said composite coupling.

15. The process of claim 13 wherein the expansion means and pilot rod are removed from the expanded, heat recoverable composite coupling by causing the expansion means and the pilot rod to pass through said composite coupling, the insert being properly and permanently positioned in said composite coupling.

16. The process of claim 13 wherein the cooled compression sleeve is expanded with a tapered tool having a leading edge equal to or less than the inside diameter of the unexpanded compression sleeve said tool tapering outward to a maximum diameter and then tapering back inward so that the back edge of the tool is less than the maximum diameter, the back edge being connected to the pilot rod so that the sleeve is expanded to a maximum amount upon contact with the maximum diameter of the tapered tool and then is allowed to spring back so that upon insertion of the coupling insert carried on the pilot rod, the expanded sleeve springs back over the insert to form a tight composite coupling.

17. The process of claim 13 wherein the cooling step is accomplished by insertion of the sleeve into a container having liquid nitrogen.

\* \* \* \* \*

UNITED STATES PATENT OFFICE
CERTIFICATE OF CORRECTION

PATENT NO. : 3,872,573
DATED : March 25, 1975
INVENTOR(S) : Paul E. Nichols and Charles L. Martin It is certified that error appears in the above-identified patent and that said Letters Patent are hereby corrected as shown below:

Column 2, line 51, change "radial" to --circumferential--.

Column 3, line 13, change "radial" to --circumferential--.

Column 3, line 13, change "Docket 142/41" to Serial No. 404,723--.

Column 5, line 12, change "radial" to --circumferential--.

Column 5, line 17, change "radial" to --circumferential--.

Column 5, line 51, change "transversed" to --transverse--.

Claim 15, line 1, change "13" to --14--.

Claim 16, line 1, change "13" to --14--.

Claim 17, line 1, change "13" to --14--.

Signed and Sealed this twenty-ninth Day of July 1975

[SEAL]

Attest:

RUTH C. MASON
Attesting Officer

C. MARSHALL DANN
Commissioner of Patents and Trademarks